United States Patent
Wilson et al.

(10) Patent No.: US 9,426,541 B2
(45) Date of Patent: *Aug. 23, 2016

(54) STB/DVR VIDEO SURVEILLANCE

(71) Applicant: AT&T Intellectual Property I, LP, Atlanta, GA (US)

(72) Inventors: Brian Wilson, Woodward, IA (US); Roger A. Cockrell, San Antonia, TX (US); Elaine Jureczki, San Antonio, TX (US); Thomas Scott Webster, Mystic, CT (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 672 days.

This patent is subject to a terminal disclaimer.

(21) Appl. No.: 13/870,525

(22) Filed: Apr. 25, 2013

(65) Prior Publication Data

US 2013/0239148 A1    Sep. 12, 2013

Related U.S. Application Data

(63) Continuation of application No. 13/225,717, filed on Sep. 6, 2011, now Pat. No. 8,451,330, which is a continuation of application No. 11/818,646, filed on Jun. 15, 2007, now Pat. No. 8,035,686.

(51) Int. Cl.
*G06F 15/167* (2006.01)
*H04N 21/81* (2011.01)
*G08B 13/196* (2006.01)
*H04N 5/76* (2006.01)
*H04N 7/18* (2006.01)

(52) U.S. Cl.
CPC ........ *H04N 21/8126* (2013.01); *G08B 13/1968* (2013.01); *G08B 13/19682* (2013.01); *H04N 5/76* (2013.01); *H04N 7/181* (2013.01)

(58) Field of Classification Search
CPC .................................................. H04N 21/8126
USPC .................................. 709/213, 217, 220, 223
See application file for complete search history.

(56) References Cited

U.S. PATENT DOCUMENTS

| | | |
|---|---|---|
| 6,850,252 B1 | 2/2005 | Hoffberg |
| 6,941,575 B2 | 9/2005 | Allen |
| 6,954,467 B1 | 10/2005 | Hillier |
| 7,028,331 B2 | 4/2006 | Schwalb |
| 7,058,710 B2 | 6/2006 | McCall |
| 7,071,968 B2 | 7/2006 | Novak |
| 2004/0148632 A1 | 7/2004 | Park |

OTHER PUBLICATIONS

"Siemens Press Release", www.myrio.com, Oct. 4, 2005.

*Primary Examiner* — Joseph E Avellino
*Assistant Examiner* — Marshall McLeod
(74) *Attorney, Agent, or Firm* — Guntin & Gust, PLC; Andrew Gust

(57) ABSTRACT

A system that incorporates teachings of the present disclosure may include, for example, a media processor that includes a memory and a controller coupled with the memory. The controller can be operable to provide an electronic program guide for display on a video display device, where the electronic program guide includes a surveillance entry associated with a security system in communication with the controller. Other embodiments are disclosed.

20 Claims, 7 Drawing Sheets

STB/DVR VIDEO SURVEILLANCE

CROSS-REFERENCE TO RELATED APPLICATIONS

This application is a continuation of and claims priority to U.S. patent application Ser. No. 13/225,717 filed Sep. 6, 2011, which is a continuation of U.S. patent application Ser. No. 11/818,646 filed Jun. 15, 2007 now U.S. Pat. No. 8,035,686, the disclosures of all of which are incorporated herein by reference in their entirety.

FIELD OF THE DISCLOSURE

The present application relates generally to digital video broadcasting systems. More particularly, example embodiments are directed to a system, method and machine readable medium for video surveillance within a video broadcast system.

BACKGROUND

Recent developments in digital technology have spurred the development and deployment of digital video broadcasting services. The digital video broadcasting services, including high quality video programming such high definition (HD) programs, are typically provided by satellite broadcasters, terrestrial broadcasters and cable broadcasters. More recently, digital broadcast programs have also been deployed via the Internet Protocol (IP) by major telecommunication providers.

Video broadcasters have traditionally distributed video broadcasts to viewers using a variety of broadcasting standards, including the analog National Television Standard Committee (NTSC) standard. More recently, with the constant expansion of the number of video broadcast channels, HD video broadcasts and provision of data, all of which have placed a premium on bandwidth for transmission, the distribution of video broadcasts has been achieved via digital standards, including the Advanced Technical Systems Committee (ATSC) standard. Other digital standards that are being used today include the Moving Picture Experts Group H.262 (MPEG-2) standard, the H.264 (MPEG-4) standard and the Digital Video Broadcasting (DVB) standard.

Digital video broadcasts are transmitted or distributed from the aforementioned video broadcasters via a variety of video distributions systems to an end user's digital set top box (STB) which decodes the digital video signal for display on a video display device (e.g., television). The digital video signal may be received by the STB via a satellite dish, a coaxial cable, a telephone line (including digital subscriber line (DSL)), Ethernet, local and wide area wireless technologies, and the like.

Recent advancements in digital video recording technology in set top boxes have further incorporated digital video recorder (DVR) functionality into the STB for recording digital video broadcasts to a digital storage medium (e.g., hard drive, optical storage, and the like) and playing back the recorded digital video broadcasts to the video display device. The DVR functionality operates using the EPG data for scheduling the recording of particular video broadcasts.

A variety of electronic surveillance systems have been employed for monitoring premises and detecting intruders. Operators of the aforementioned video distribution systems have continuously grappled with integration of different services via the video distribution systems to improve users' experience and therefore retain users.

BRIEF DESCRIPTION OF THE DRAWINGS

Some embodiments are illustrated by way of example and not limitation in the figures of the accompanying drawings in which.

DETAILED DESCRIPTION

An example system, method and machine readable medium for video surveillance within a video broadcast system are described.

In accordance with an example embodiment, there is provided a method, system and machine-readable medium for managing surveillance video at a broadcast video terminal device. The method comprises: detecting a security event associated with at least one surveillance video camera communicatively coupled to the broadcast video terminal device; and inserting a surveillance entry associated with storage of a surveillance video of each of the at least one surveillance video camera into an electronic program guide that includes at least one broadcast entry.

In accordance with another example embodiment, there is provided a method, system and machine-readable medium for managing surveillance video entries. The method comprises: receiving a request from a broadcast video terminal device to insert a surveillance entry into an electronic program guide, the surveillance entry associated with storage of a surveillance video captured by at least one surveillance video camera to the broadcast video terminal device; and inserting the surveillance video entry into the electronic program guide.

In accordance with yet another example embodiment, there is provided a method, system and machine-readable medium for playing a surveillance video. The method comprises: displaying an electronic program guide on a video display associated with a broadcast video terminal device, the electronic program guide including a surveillance entry; retrieving surveillance video associated with the surveillance entry from the broadcast video terminal device; and displaying the retrieved surveillance video on the video display device.

Figure 1:
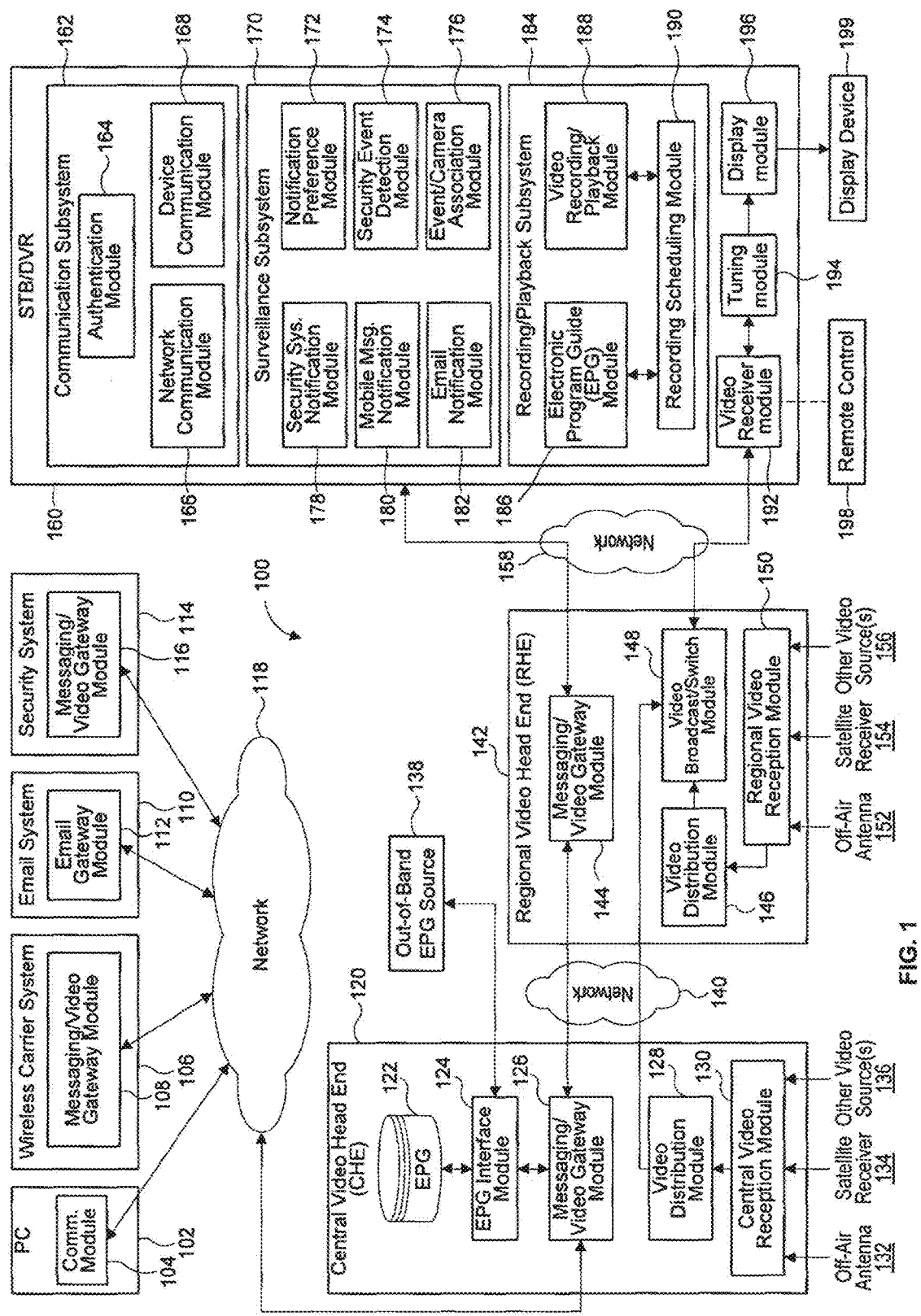
FIG. 1 is a high-level block diagram of an example video broadcasting system that integrates video surveillance into the video broadcasting system.

FIG. 1 is a high-level block diagram of an example video broadcasting system 100 that integrates video surveillance into the video broadcasting system 100. The video broadcasting system 100 includes remote systems 102, 106, 110 and 114, a central video head end (CHE) 120, a regional video head end (RHE) 142, and a set top box/digital video recorder (STB/DVR) unit 160 (e.g., broadcast video terminal device). The remote systems 102, 106, 110 and 114 are communicatively interconnected to the CHE via network 118. More specifically, personal computer (PC) 102 includes a communication module 104 interconnecting PC 102 via network 118, wireless carrier system 106 includes a wireless system gateway module 108 to enable the wireless carrier system 106 to interconnect one or more mobile devices (not shown) such as cellular telephones via network 118, email system 110 includes an email gateway 112 to enable the email system 110 to interconnect one or more email recipients via network 118, and a security system 114 including a security system gateway 116 to interconnect the security system 114 via network 118.

Further with reference to FIG. 1, the CHE 120 is in turn communicatively interconnected to a regional video head end (RHE) 142 via network 140. Still in turn, the RHE 142 is communicatively interconnected to an end user's STB/DVR unit 160 via network 158. It is noted that for clarity and simplicity of the depiction, only one CHE 120, one RHE 142 and one STB/DVR unit 160 are described. However, the video broadcasting system 100 may include multiple CHEs 120; each CHE 120 may be interconnected to multiple RHEs 142; and each RHE 142 may be interconnected to multiple STB/DVR units 160 as may be desired. The network 118 interconnecting the remote systems 102, 106, 100 and 114 and the CHE 120 may be any conventional transfer control protocol/internet protocol (TCP/IP) network and the like. The network 140 interconnecting the CHE 120 and the RHE 142 may be a long haul transport network (e.g., gigabit Ethernet network, Asynchronous Transfer Mode (ATM) network, frame relay network) and the like. The network 158 interconnecting the RHE 130 and the STB 148 may be a network such as fiber to the home (FTTH), fiber to the node (FTTN), public switched telephone network (PSTN) (including digital subscriber line (DSL)), coaxial cable, hybrid fiber/coaxial, and combinations thereof Alternate networks and combinations thereof may also be employed to interconnect the remote systems 102, 106, 110, 114 to the CHE 120, CHE 120 to the RHE 142 and the RHE 142 to the STB/DVR unit 160.

Now with particular reference to the video distribution of central video head end (CHE) 120 of FIG. 1, the CHE 120 includes an electronic program guide (EPG) database 122 that maintains EPG data for each of one or more STB/DVR units 160. As will be described in greater detail below, the EPG database 122 maintains not only programming information (e.g., programming schedules) relating to broadcasts channels but also surveillance information relating to surveillance recordings (already recorded, currently being recorded, scheduled for recording) of the STB/DVR unit 160. The EPG interface module 124, receives out-of-band EPG data from out-of-band EPG source 138, which aggregates and maintains EPG data from multiple broadcast networks (e.g., ABC, NBC, ESPN and the like), and updates the EPG database 122 for each related STB/DVR unit 160 with updated schedules. Other sources of EPG data are possible, such as in-band EPG data that may be extracted from video programming received by the central video reception module 130, which is described in greater detail herein below. The EPG interface module 124 may also receive requests for EPG data maintained in EPG database 122 from STB/DVR unit 160, query the EPG database 122 for appropriate EPG data (including programming and surveillance information) and return the retrieved EPG data to the STB/DVR unit 160. The EPG data identifies video broadcasts in accordance with the ATSC standard A/65 (commonly referred to an event information table (EIT)), designating their respective time slots and broadcast channels (e.g., carrier frequencies coupled with transport stream identifier (TSID)). Similarly to the video broadcasts, the EPG data may identify the different video surveillance recordings, video surveillance being recorded and/or scheduled video surveillance recordings via a virtual broadcast channel (e.g., non-used broadcast channel) and time slot in the EPG data of EPG database 122. It is noted that in addition to the EIT table, a plurality of other tables not enumerated here, which describe or identify surveillance recordings and associated features, may be provided in accordance with the ATSC standard A/65.

Further with reference to FIG. 1, the CHE 120 includes a messaging/video gateway module 126 interconnected via network 118 to remote devices 102, 106, 110 and 114. The messaging/video gateway module 126 of CHE 120 enables EPG data, messaging and video associated with surveillance via particular STB/DVR unit 160 to be available to, amongst others, the STB/DVR unit 160 and remote systems 102, 106, 110 and 114, as will be described in greater detail herein below.

Still further with reference to FIG. 1, the CHE 120 includes a central video reception module 130 that receives video programming of video broadcasts from multiple video sources, including off-air antenna 132, satellite receiver 134, as well as any other video sources 136, which may include fiber feed sources, video servers and tape machines, which serve video programming The video programming received by the video reception module 130 may be in a variety of formats, including NTSC, ATSC, MPEG-2, MPEG-4, DVB, Windows Media, baseband digital, and other available formats. The CHE 120 further includes a video distribution module 128 that cooperates with the video reception module 130 to distribute the video programming received by the video reception module 130 to a video broadcast/switch module 148 of a regional video head end (RHE) 142, which is described in greater detail herein below. More specifically, the central video reception module 130 may decode (via one or more video decoders) (not shown) the video programming received in the aforementioned different formats into a standardized format. In turn, the video distribution module 128 may further encode (via one or more video encoders) (not shown) the video programming provided in the standardized format by the video reception module 130 into a digital format for ultimate distribution to the STB/DVR unit 160 (e.g., MPEG-2, MPEG-4 and the like). The video distribution module 128 may further multiplex (e.g., via statistical multiplexing) video broadcasts of multiple digital video broadcast channels over one carrier frequency allocation (e.g., 6 MHz or 8 MHz), which is a typical carrier frequency allocation that may be used for one analog channel.

Now with particular reference to video distribution of the regional video head end (RHE) 142 of FIG. 1, the RHE 142 includes a regional video reception module 150 that receives local video programming or broadcasts from multiple video sources, including off-air antenna 152, satellite receiver 154 and other video sources 156. The local video programming received by the regional video reception module 142 may be in a variety of formats, including NTSC, ATSC, MPEG-2, MPEG-4, DVB, Windows Media, baseband digital, and other available formats. The other video sources 156 may include fiber feed sources, video servers and tape machines, which serve video programming In addition, the other video sources 156 may also include video programming received via telecom transport networks directly from a broadcaster (e.g., ABC, ESPN and the like) in any of the foregoing formats. The RHE 142 further includes a video distribution module 146 that cooperates with the regional video reception module 150 to distribute the local video programming received by the video reception module 142 to an end-user's STB/DVR unit 160. Similarly to the central video reception module 130 of the CHE 120, the regional video reception module 150 of the RHE 142 may decode (via video decoders) (not shown) the local video programming received in the aforementioned different formats into a standardized format. In turn, the video distribution module 146 may further encode (via video encoders) (not shown) the video programming provided in the standardized format by the regional video reception module 150 into a digital format for ultimate distribution to the STB/DVR unit 160 (e.g., MPEG-2, MPEG-4 and the like). The video distribution module 146 may further multiplex (e.g., via statistical multiplexing) video broadcasts of multiple digital video broadcast channels over one carrier frequency allocation (e.g., 6 MHz or 8 MHz). Still further, the video programming from the video distribution module 128 of the CHE 120 and the video programming from the video distribution module 146 of the RHE 142 are distributed to the video broadcast/switch module 148, which broadcasts or switches channels of the video programming from the CHE 120 and the RHE 142 to a video receiver module 192 of the end-user's STB/DVR unit 160.

Now with particular reference to the messaging/video gateway of the regional video head end (RHE) 142, the messaging/video gateway module 144 of RHE 142 make available to or routes EPG data, messaging and surveillance video between appropriate STB/DVR unit 160 and one or more of the remote systems 102, 106, 110 and 114 via messaging/video gateway module 126 of CHE 120. More specifically, the RHE 142 may be communicatively interconnected to (e.g., may serve) plural STB/DVR units.

Now with particular reference video distribution of STB/DVR unit 160, the STB/DVR unit 160 includes a video receiver module 192, a tuning module 194 and a display module 196. The video receiver module 192 receives video programming from the video broadcast/switch module 148 of the RHE 142. Upon channel selection by a user via a remote control 198, the tuning module 192 may select a particular channel from the video programming received by the video receiver module 192 (if multiple channels including the channel selected are being received) for display by the display module 196 on the display device 199. Alternatively, upon channel selection by the user via the remote control 198, the tuning module 192 may request the video receiver module 192 to request the video broadcast/switch module 148 to switch the video programming to the requested channel (if a non-requested channel is being received) for display by the display module 196 on the display device 199.

Further with particular reference to video surveillance of the STB/DVR unit 160, the STB/DVR unit 160 includes a communication subsystem 162 that facilitates STB/DVR unit 160 in communicating with remote systems 102, 106, 110 and 114, as well as with CHE 120 and RHE 142 via network communication module 166 and with local devices (described in greater detail with reference to FIG. 2 hereinbelow) via device communication module 168. The communication subsystem 162 includes an authentication module 164 that may authenticate remote systems 102, 106, 110 and 114 and local devices (FIG. 2) to interact with the STB/DVR unit 160, among other things, relating to video surveillance, via username/password and the like. The network communication module 166 is enabled to communicate with the messaging/video gateway module 144 of the RHE 142 via network 158, while the device communication module 168 is enabled to communicate with local devices (e.g., STB, PC, camera, security system and the like) that may be interconnected to the STB/DVR unit 160 via a local network (FIG. 2), wirelessly via connections such Bluetooth, 802.11 (Wi-Fi), infrared, and the like, or via wired connections such as Ethernet and the like.

Further with reference to video surveillance of the STB/DVR unit 160, the STB/DVR unit 160 includes a surveillance subsystem 170 that may detect security events in the premises via event messages (or signals) from one or more cameras (FIG. 2) or via event messages (or signals) from a local security system (FIG. 2) interconnected to the STB/DVR unit 160. More specifically, security event detection module 174 detects or receives event messages from the one or more cameras (FIG. 2), via motion or sound detection, or from local security system (FIG. 2), via one or more contact closures such as on windows, doors and the like.

Upon receipt of a security message from a video camera (FIG. 2), the security event detection module 174 triggers a recording scheduling module 190 to schedule and begin recoding of a surveillance video from that the particular video camera, as will be described in greater detail hereinafter. It is to be noted that the surveillance video that is recorded and later played back may include both video and audio. It is further to be noted the surveillance video may be a similar format to the broadcast video received by the STB/DVR unit 160 (e.g., MPEG-2, MPEG-4, and the like). Other formats may include QuickTime, Realplayer, and Motion JPEG. However, upon receipt of a security message from the local security system (FIG. 2), the security event detection module 174 transmits the particular security message to the event/camera association module 176 which determines an association of the particular security message from the local security system with a particular video camera. The security message from the local security system may include an event code, a zone code or the like to indicate which contact closure has been opened. The event/camera association module 176 may maintain a file, a table or a database (not shown) that associates the event code, zone code or the like with a particular video camera (e.g., identified by an IP address or the like). The associations may be predetermined, providing mappings of contact closures to the video cameras. Therefore, upon receipt of the particular security message, the event/camera association module 176 obtains the particular video camera (e.g., IP address) identification and transmits the video camera identification to the security event detection module 174. The security event detection module 174 triggers the particular video camera to start transmitting surveillance video and further triggers the recording scheduling module 190 to schedule and begin recoding of the surveillance video from that particular video camera.

Further with reference to the surveillance subsystem 170 of FIG. 1, the security event detection module 174 further transmits a request to a notification preference module 172 for a type of notification to be performed (e.g., recipient) for the particular security event that has been detected by the security event detection-module 174. The notification preference module 172 may maintain a file, a table or a database (not shown) that associates the particular security event messages with one or more notifications to the performed. The notification preference module 172 identifies and returns to the security event detection module 174 the notifications that may be required. The security event detection module than triggers notification modules 178-182 to notify respective remote system 106, 110, 114. Thus, upon a security event, in addition to the recoding of surveillance video via recoding/playback subsystem 184 (described in greater detail hereinbelow), the surveillance subsystem 170 may notify remote systems 106, 110 and/or 114 of the security event. That is, the security system notification module 178 may generate a notification message that includes security event data to the messaging/video gateway module 116 of the security system 114. The mobile message notification module 180 may generate a mobile message that includes the security event and transmits the mobile message to the messaging/video gateway 108 of the wireless carrier system 106, which it turn delivers it to a recipient mobile device. The email notification module 182 may generate an email message that includes the security event and transmits the email message to the email gateway 112 of the email system 110, which in turn delivers the email message to a recipient mailbox. Upon receipt of one or more notifications to the remote systems 106, 110 and/or 114, the recipient systems may by using a personal computer, such as PC 102, access the STB/DVR unit 160 via authentication module 164 and may view the surveillance video from one or more cameras (FIG. 2) via the network communication module 166 and device communication module 168.

Still further with reference to FIG. 1, the STB/DVR unit 160 includes a recording/playback subsystem 184 that facilitates scheduling of surveillance video recordings, recording surveillance video as triggered by security events, playback of surveillance video recordings, and interfaces such recording with EPG data maintained in EPG database 122 of the CRE 120. After the security event detection module 174 detects one or more security events, it triggers the recording scheduling module 190 to schedule recording of surveillance video from one or more video cameras corresponding to the security events (e.g., video camera associated with a particular security system Contact closure, motion/sound detection via a particular video camera, and the like). The recording scheduling module 190 requests a video recording/playback module 188 to start recording surveillance video from one or more video cameras corresponding to the security events. The video recording/playback module 188 may record the surveillance video from one or more video cameras in a form of one or more video files (e.g., each video file having a video filename) on a storage medium (e.g., hard disk, optical disk, and the like) of the STB/DVR unit 160. Similarly to the video broadcasts, the surveillance video files may be recoded in MPEG-2, MPEG-4 and the like formats. The recording scheduling module 190 may associate each of the one or more surveillance video files with a virtual channel number for later replay via the STB/DVR unit 160. The recording scheduling module 190 also transmits an update request (including video filenames, associated virtual channel numbers and start times) to the EPG module 186 to update the EPG data for the STB/DVR unit 160 with one or more entries corresponding to the surveillance video files being recorded from the one or more video cameras associated with the one or more security events. In response to receiving a request from the recording scheduling module 190, the EPG module 186 transmits a request to the EPG interface module 124 of CRE 120 to update EPG data for the STB/DVR unit 160 with the one or more entries corresponding to the surveillance video from one or more video cameras associated with the security events.

Yet further with reference to FIG. 1, the recording scheduling module 190 further may request the video recording/playback module 188 to stop recording the surveillance video from the one or more video cameras corresponding to the security events if no additional security events associated with the one or more camera are triggered by the security event detection module 174 within a predetermined time period (e.g., 30 minutes or the like) from the start time of a respective surveillance video recording. The recording scheduling module 190 transmits an update request (including video filenames, associated virtual channel numbers and stop times) to the EPG module 186 to update the one or more entries corresponding to the surveillance video files in EPG database 122 for the STB/DVR unit 160. In response to receiving a request from the recording scheduling module 190, the EPG module 186 transmits a request to the EPG interface module 124 of CHE 120 to update EPG data for the one or more entries corresponding to the surveillance video from one or more video cameras associated with the security events for the STB/DVR unit 160 with the corresponding stop times.

In addition with reference to FIG. 1, video recording/playback module 188 may playback surveillance video stored to the STB/DVR 160 via associated surveillance entry in the EPG data stored to EPG database 122. Specifically, a user via remote control 198 may request STB/DVR unit 160 via EPG module 186 to retrieve the EPG data from EPG database 122 for the STB/DVR unit 160, which may include one or more surveillance entries. The user may then select a surveillance video entry for playback from the EPG data via remote control 198. The video recording/playback module 188 may then retrieve the surveillance video stored on STB/DVR unit 160 that is associated with the surveillance entry and play the surveillance video on the display device 199. The playback is discussed with more particularity in reference to FIGS. 5 and 6 below.

Figure 2:
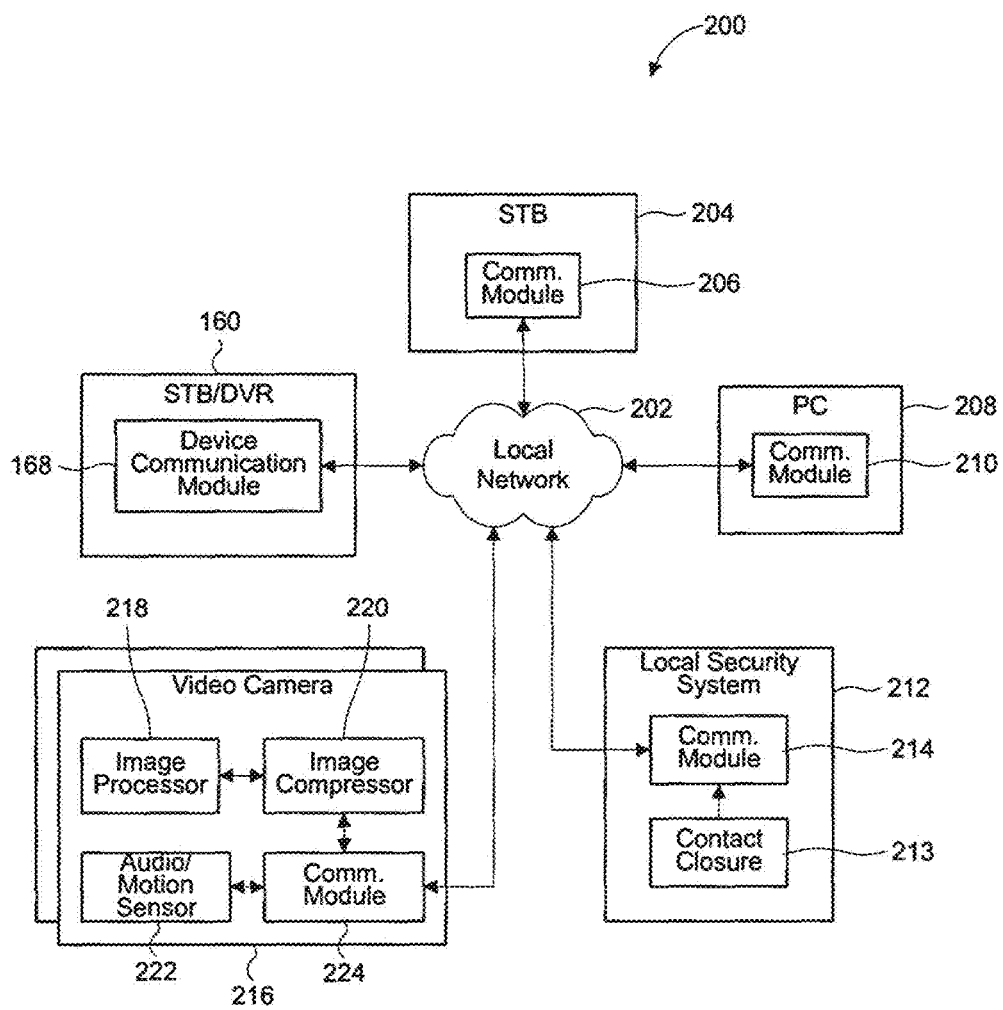
FIG. 2 is a high-level diagram depicting an example connection of one more devices to a set top box/digital video recorder (STB/DVR) unit in accordance with FIG. 1.

FIG. 2 is a high-level diagram depicting an example connection 200 of one more devices 204, 208, 212, 216 via a local network 202 to a set top box/digital video recorder (STB/DVR) unit 160 in accordance with FIG. 1. More specifically, each of the one or more video cameras 216 may connect to the device communication module 168 of STB/DVR unit 160 via communication module 224, the local security system 212 may connect via communication module 214, the personal computer (PC) 208 may connect via communication module 210 and the set top box (STB) 204 may connect via communication module 206. The connections may be wired (e.g., Ethernet and the like) or wireless (e.g., Wi-Fi, Bluetooth, infrared and the like). The STB 204 and PC 208 may request STB/DVR unit 160 via EPG module 186 to retrieve the EPG data from EPG database 122 for the STB/DVR unit 160, which may include one or more surveillance entries, and may playback a recorded video file stored on STB/DVR unit 160 that is associated with the surveillance entry via video recording/playback module 188. The STB 204 and PC 208 may also schedule recordings via recoding scheduling module 190 for surveillance recording at particular times. The local security system 212 may include one or more contact closures 213 about the premises that may be open upon an intruder entering the premises. The opening of one or more of the contact closures 213 triggers the communication module 212 to transmit one or more security event messages (or signals) to the STBID VR unit 160 to be detected to received by the security event detection module 174. The video camera 216 also includes an audio/motion sensor 222 that may transmit one or more security event message (or signals) to the STB/DVR unit 160 to be detected by the security event detection module 174. The audio/motion sensor 222 may also trigger capture of surveillance video. The video camera 216 also includes an image processor 218 that processes captured surveillance video (via video lens) and transmits the image-processed surveillance video to the image compressor 220 that compresses the surveillance video to MPEG-2, MPEG-4 or the like and transmits the surveillance video via communication module 224 to the STB/DVR unit 160. It is noted that the image compressor 220 may also receive audio input via a microphone (not shown) and compress the surveillance video and audio to MPEG-2, MPEG-4 or the like for transmission to the STB/DVR unit 160.

Figure 3:
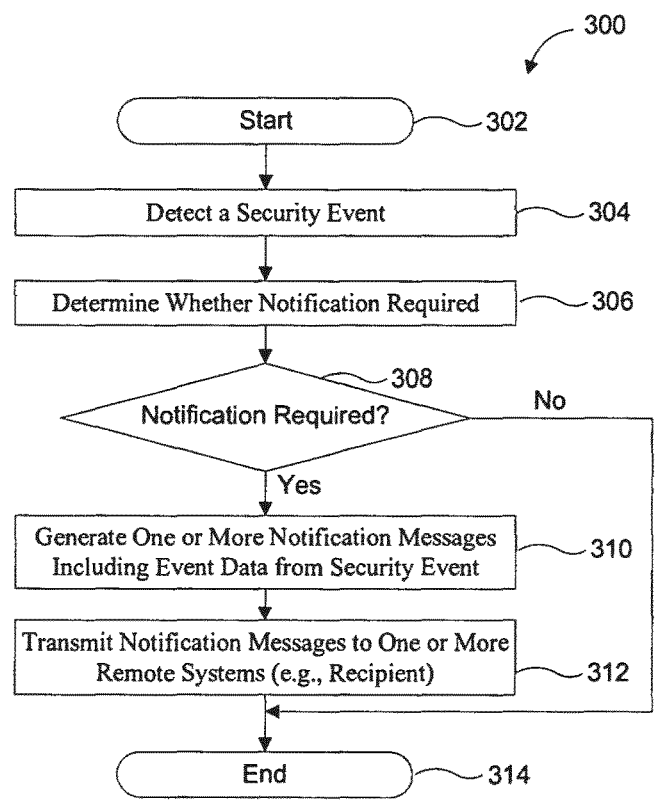
FIG. 3 is flowchart that illustrates an example method performed by the STB/DVR unit in notifying a remote system of a security event in accordance with FIG. 1-2.

FIG. 3 is flowchart that illustrates an example method 300 performed by STB/DVR unit 160 in notifying a remote system 106, 110 and/or 114 of a security event in accordance with FIGS. 1-2. The method 300 starts at operation 320. At operation 304, the security event detection module 174 of the surveillance subsystem 170 of STB/DVR unit 160 detects a security event (e.g., from one or more video cameras 216 and/or local security system 212). At operation 306, the security event detection module 174 determines via notification preference module 172 security notifications that are required. If no notifications are required the method continues at operation 314. If it is determined that security notifications are required at operation 308, then at operation 310 one or more of the notification modules 178-182 are triggered to generate one or more notification messages including event data from the security event. Thereafter, the notification modules 178-182 transmit the one or more notification messages via network communication module 166 to the respective remote systems 106, 110 and/or 114. The method ends at operation 314.

Figure 4:
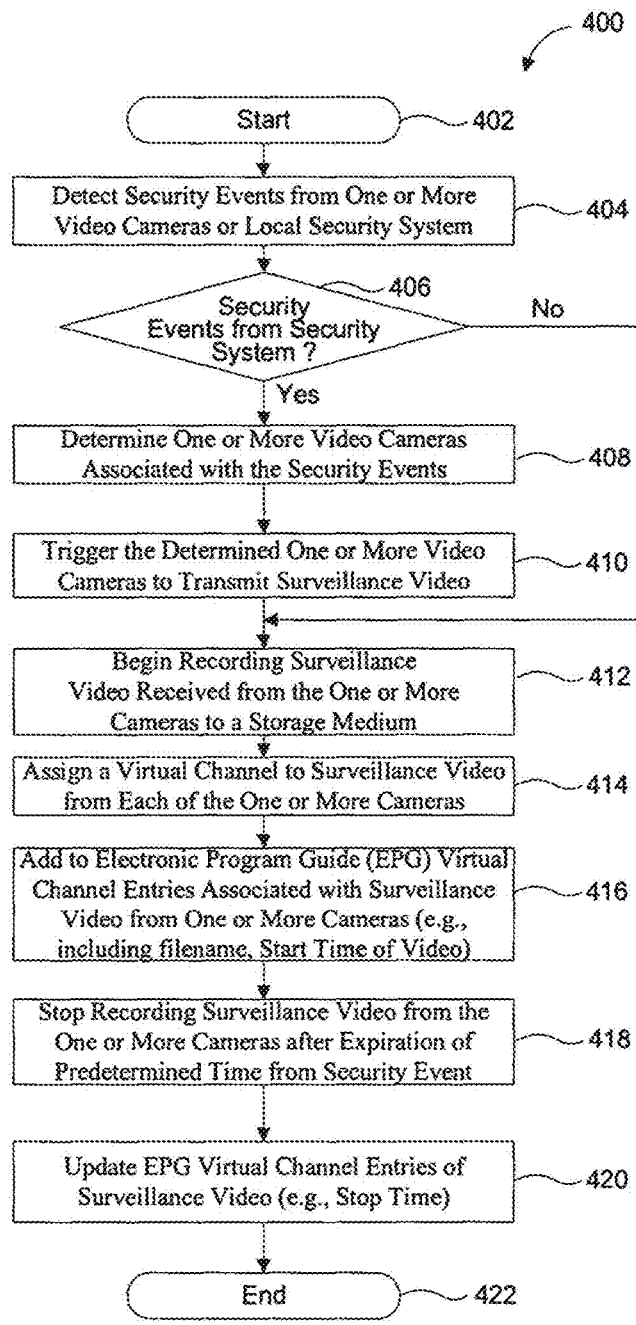
FIG. 4 is flowchart that illustrates an example method performed by the STB/DVR unit in recoding surveillance video of a security event in accordance with FIGS. 1-2.

FIG. 4 is flowchart that illustrates an example method 400 performed by STB/DVR unit 160 in recoding- surveillance video of a security event in accordance with FIGS. 1-2. The method 400 begins at operation 402. At operation 404, the security event detection module 174 of the surveillance subsystem 170 of STB/DVR unit 160 detects security events from one or more video cameras 216 and/or local security system 212. At operation 406, the security event detection module 174 determines whether security events are from the security system 212. If it is determined that the security events are not from the security system 212, the method 400 continues at operation 412. Alternatively, at operation 408, security event detection module 174 determines via event/camera association module 176 one or more cameras 216 associated with the security events. Thereafter, at operation 410, the security event detection module 174 triggers the determined video cameras to transmit surveillance video to the STB/DVR unit 160. At operation 412, the security event detection module 174 triggers the recoding scheduling module 190 to begin recoding surveillance video received from the video cameras 216 to a storage medium (not shown) (e.g., storage medium included in or associated with STB/DVR unit 160) via video recording/playback module 188. At operation 414, the recoding scheduling module 190 assigns or associates a virtual channel number with each surveillance video from the one or more cameras 126. Thereafter, at operation 416 the recoding scheduling module 190 insets into or adds to the electronic program guide (EPG) data in EPG database 122 for the STB/DBR 160 virtual channel entries associated with each surveillance video from the one or more video cameras 216. This may be accomplished by the recording scheduling module 190 requesting the EPG module 186 to request update of the EPG database 122 via EPG interface module 124. The virtual channel entry may include the surveillance video's filename on the storage medium and start time of recording. At operation 418, the recoding scheduling module 418 triggers the video recording/playback module 188 to stop recording the video from the one or more cameras 216 after expiration of a predetermined period of time from the security event (e.g., 30 minutes and the like). At operation 420, the recording scheduling module 190 via the EPG module 186 and EPG interface module 124 updates virtual channel entries in the EPG data of EPG database 122 for STB/DBR 160 with stop times. The method 400 ends at operation 422.

Figure 5:
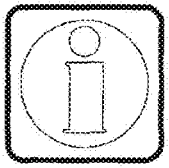
FIG. 5 is an example embodiment of electronic program guide data that may be displayed by STB/DVR on a display device in accordance with FIG. 1.

FIG. 5 is an example embodiment of electronic program guide data 500 that may be displayed by STB/DVR 160 on a display device 199, in accordance with FIG. 1. Upon selection by a user via the remote control 198, the display module 196 may display a portion of the example electronic program guide data 500 from EPG database 122 to the user on the display device 168 for a current date 502. The user may view other portions by scrolling through electronic program guide entries via the remote control 198. The displayed portion may include a video broadcast portion 506 including plural video broadcast entries (e.g., channels 162 through 170) for a block of time 504 (e.g., from 2:00 PM to 3:330 PM) and surveillance video potion 508 (e.g., channels 701 through 704) including plural surveillance video entries 510-516. A video broadcast entry from the video broadcast portion 506 or surveillance video entry (e.g., surveillance video entry 510) from surveillance video portion 508 may be highlighted by the user using, for example, the remote control 198, and a description portion 518 there for is displayed on the display device 199. For example, description portion 518 for video surveillance entry 510 indicates that a scheduled surveillance video recording was recorded on a particular date and for a particular length of time and is available for playback on a designated channel 701. The user may select to play the highlighted surveillance video entry 510 by tuning to the designated channel (e.g., 701) associated with the surveillance video entry. Upon receiving a channel selection from user that is designated for a surveillance video entry (e.g., 510), the video receiver module 192 notifies the video recoding/playback module 188 to retrieve from STB/DVR 160 surveillance video that is associated with the surveillance entry and begin playback of the retrieved surveillance video to the designated channel and the video receiver module 192 tunes to the designated channel for surveillance video entry playback. The user may also choose to play the highlighted surveillance video entry 510 by selecting a designated button (not shown) on the remote control 198, which similarly causes the video receiver module 192 to notify the video recoding and playback module 188 to retrieve from STB/DVR 160 surveillance video that is associated with the surveillance entry and play the surveillance video and to tune to the designated channel (e.g., 701). Upon termination of the-surveillance video associated with the surveillance video entry 510 playback, the electronic program guide may be once again redisplayed on display device 199.

Figure 6:
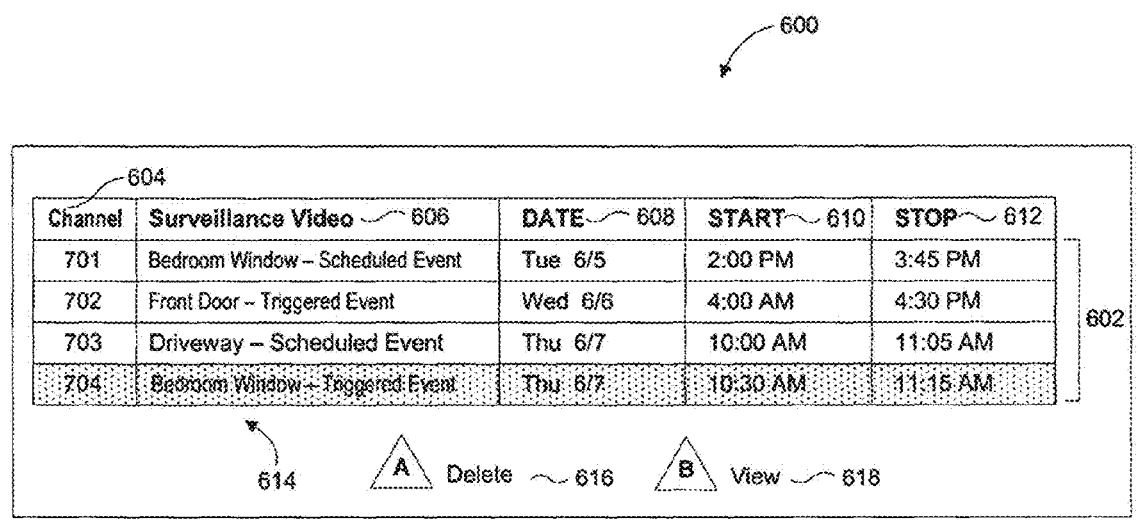
FIG. 6 is another example embodiment of electronic program guide data that may be displayed by STB/DVR on a display device in accordance with FIG. 1.

FIG. 6 is another example embodiment of electronic program guide data 600 that may be displayed by STB/DVR 160 on the display device 199 in accordance with FIG. 1. This embodiment of the electronic program guide data 600 illustrates only surveillance event entries 602 (e.g., example surveillance event history). Upon selection by a user via the remote control 198, the display module 196 may display the electronic program guide data 600 to the user on the display device 199. Electronic program guide data 600 is stored in the EPG database 122 and may include one or more surveillance video entries 602 that have been recorded by the STB/DVR 160. It should be noted that the surveillance video entries 602 are similar to entries 508 illustrated in FIG. 5. Each of the surveillance video entries 602 includes a designated channel 604, a surveillance video entry description 606, a date of surveillance video recording 608, a start time 610 and a stop time 612 of surveillance video recording. A selected surveillance video entry 614 may be deleted via 616 or played back via 618 by selecting an appropriate button (not shown) on remote control 198. Playback may be accomplished in a similar fashion described above in reference to FIG. 5.

Figure 7:
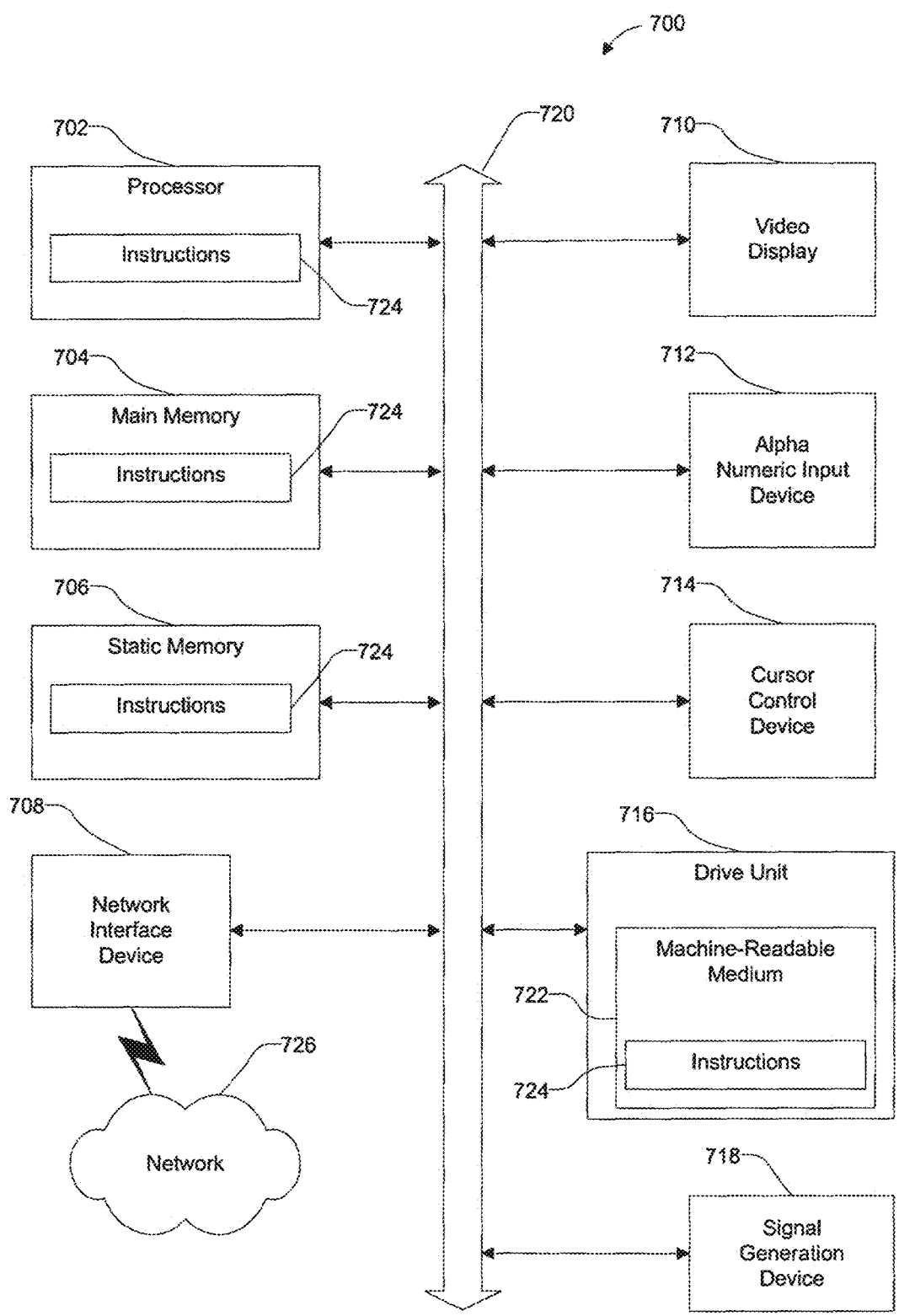
FIG. 7 is a diagrammatic representation of machine in an example form of a computer system within which a set of instructions, for causing the machine to perform anyone or more of the methodologies described herein in FIGS. 1-6, may be executed.

FIG. 7 is a diagrammatic representation of machine in an example form of a computer system within which a set of instructions, for causing the machine to perform anyone or more of the methodologies discussed herein in FIGS. 1-6, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform anyone or more of the methodologies discussed herein.

Further with reference to FIG. 7, the example computer system 700 includes a processor 702 (e.g., a central processing unit (CPU), a graphics processing unit (GPU) or both), a main memory 704 and a static memory 706, which communicate with each other via a bus 720. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 708.

Still further with reference to FIG. 5, the disk drive unit 716 includes a machine-readable medium 722 on which is stored one or more sets of instructions and data structures (e.g., software 724) embodying or utilized by anyone or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 708 utilizing anyone of a number of well-known transfer protocols (e.g., HTTP).

Lastly with reference to FIG. 7, while the machine-readable medium 722 is shown in the example embodiment to be a single medium, the term "machine readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for video surveillance within a video broadcast system have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:
1. A method comprising:
receiving, at a media processor, an electronic program guide that includes a surveillance entry, wherein the surveillance entry includes video content associated with a security event, wherein the surveillance entry is inserted into the electronic program guide responsive to a detection of the security event; and presenting, by the media processor, the electronic program guide at a video display.

2. The method of claim 1, wherein the electronic program guide comprises security event information for the surveillance entry, and wherein the security event information comprises a time for the security event.

3. The method of claim 1, wherein the electronic program guide comprises security event information for the surveillance entry, and wherein the security event information comprises a location of the security event.

4. The method of claim 1, comprising transmitting, by the media processor, a request for insertion to a remote server, wherein the surveillance entry is inserted into the electronic program guide by the remote server in response to the request for insertion.

5. The method of claim 4, wherein the detection of the security event is by a security system.

6. The method of claim 1, wherein the surveillance entry is associated with a virtual channel number and a filename.

7. The method of claim 1, wherein the surveillance entry is associated with a start time and a stop time.

8. The method of claim 1, comprising transmitting, by the media processor, a security event notice associated with the security event via a wireless message to a mobile device.

9. The method of claim 1, comprising transmitting, by the media processor, a security event notice associated with the security event via an email message to an end user device.

10. The method of claim 1, wherein the media processor is a mobile communication device.

11. A non-transitory computer-readable storage device comprising computer instructions, which, responsive to being executed by a processor, cause the processor to perform operations comprising:

receiving an electronic program guide that includes a surveillance entry, wherein the surveillance entry includes content associated with a security event, wherein the surveillance entry is inserted into the electronic program guide responsive to a detection of the security event; and presenting the electronic program guide.

12. The non-transitory computer-readable storage device of claim 11, wherein the surveillance entry is associated with a virtual channel number and a filename.

13. The non-transitory computer-readable storage device of claim 11, wherein the surveillance entry is associated with a start time and a stop time.

14. The non-transitory computer-readable storage device of claim 11, wherein the operations further comprise transmitting a security event notice associated with the security event to an end user device.

15. The non-transitory computer-readable storage device of claim 11, wherein the surveillance entry includes a time for the security event.

16. The non-transitory computer-readable storage device of claim 11, wherein the surveillance entry includes a location of the security event.

17. A device comprising:

a memory to store computer instructions; and a controller coupled with the memory, wherein the controller, responsive to executing the computer instructions, performs operations comprising:

receiving an electronic program guide that includes a surveillance entry, wherein the surveillance entry includes content associated with a security event, wherein the surveillance entry is inserted into the electronic program guide responsive to a detection of the security event; and presenting the electronic program guide.

18. The device of claim 17, wherein the electronic program guide comprises security event information for the surveillance entry, and wherein the security event information comprises a time of the security event and a location of the security event.

19. The device of claim 17, wherein the operations further comprise transmitting a security event notice associated with the security event to an end user device.

20. The device of claim 17, wherein the operations further comprise:

receiving a channel selection associated with the surveillance entry;

retrieving surveillance video associated with the surveillance entry from the memory responsive to the channel selection; and displaying the surveillance video on a video display.

* * * * *